(12) United States Patent  (10) Patent No.: US 9,033,625 B2
Stadtfeld  (45) Date of Patent: May 19, 2015

(54) BEVEL GEAR MANUFACTURE WITH FACE CUTTERS WITHOUT SWING AXIS MOTION

(75) Inventor: Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 482 days.

(21) Appl. No.: 13/569,214

(22) Filed: Aug. 8, 2012

(65) Prior Publication Data

US 2013/0039712 A1  Feb. 14, 2013

Related U.S. Application Data

(60) Provisional application No. 61/521,154, filed on Aug. 8, 2011.

(51) Int. Cl.
*B23F 9/00* (2006.01)
*B23F 9/02* (2006.01)
*B23F 9/10* (2006.01)

(52) U.S. Cl.
CPC . *B23F 9/025* (2013.01); *B23F 9/10* (2013.01); *B23F 9/105* (2013.01)

(58) Field of Classification Search
CPC .............. B23F 9/10; B23F 9/105; B23F 9/12; B23F 9/14; B23F 9/082; B23F 9/084; B23F 1/00; B23F 1/06
USPC .......... 409/39, 38, 51, 50, 11, 12, 13; 451/47, 451/8, 9, 10
See application file for complete search history.

(56) References Cited

U.S. PATENT DOCUMENTS

| 4,981,402 A | 1/1991 | Krenzer et al. |
| 5,580,298 A | 12/1996 | Stadtfeld |
| 6,669,415 B2 | 12/2003 | Stadtfeld et al. |
| 6,712,566 B2 | 3/2004 | Stadtfeld et al. |
| 2004/0105731 A1 | 6/2004 | Kreh |

OTHER PUBLICATIONS

International Search Report and Written Opinion for corresponding PCT application, PCT/US2012/049882.

*Primary Examiner* — Daniel Howell
*Assistant Examiner* — Alan Snyder
(74) *Attorney, Agent, or Firm* — Robert L. McDowell

(57) ABSTRACT

A method of machining bevel gears whereby machining of both flanks of a tooth slot and crowning of the tooth surfaces in the lengthwise direction are realized without an active pivot axis and by a modification of the conventional relationship between the radial and swivel basic settings during gear generating.

8 Claims, 12 Drawing Sheets

1. Z - slide
2. X - slide
3. Y - slide
4. Cutter spindle housing
5. Machine column

BEVEL GEAR MANUFACTURE WITH FACE CUTTERS WITHOUT SWING AXIS MOTION

This application claims the benefit of U.S. Provisional Patent Application No. 61/521,154 filed Aug. 8, 2011 the entire disclosure of which is hereby incorporated by reference.

FIELD OF THE INVENTION

The present invention is directed to the manufacture of gears and in particular to a method to generate bevel gears without a live swing or pivot axis on a gear generating machine.

BACKGROUND OF THE INVENTION

In the production of gears, especially bevel gears, two types of processes are commonly employed, generating processes and non-generating processes.

Generating processes can be divided into two categories, face milling (intermittent indexing) and face hobbing (continuous indexing). In generating face milling processes, a rotating tool is fed into the workpiece to a predetermined depth. Once this depth is reached, the tool and workpiece are then rolled together in a predetermined relative rolling motion, known as the generating roll, as though the workpiece were rotating in mesh with a theoretical generating gear, the teeth of the theoretical generating gear being represented by the stock removing surfaces of the tool. The profile shape of the tooth is formed by relative motion of the tool and workpiece during the generating roll.

In generating face hobbing processes, the tool and workpiece rotate in a timed relationship and the tool is fed to depth thereby forming all tooth slots in a single plunge of the tool. After full depth is reached, the generating roll is commenced.

Non-generating processes, either intermittent indexing or continuous indexing, are those in which the profile shape of a tooth on a workpiece is produced directly from the profile shape on the tool. The tool is fed into the workpiece and the profile shape on the tool is imparted to the workpiece. While no generating roll is employed, the concept of a theoretical generating gear in the form of a theoretical "crown gear" is applicable in non-generating processes. The crown gear is that theoretical gear whose tooth surfaces are complementary with the tooth surfaces of the workpiece in non-generating processes. Therefore, the cutting blades on the tool represent the teeth of the theoretical crown gear when forming the tooth surfaces on the non-generated workpiece.

The relationship between the workpiece and generating gear can be defined by a group of parameters known as basic machine settings. These basic settings communicate a sense of size and proportion regarding the generating gear and the workpiece and provide a common starting point for gear design thus unifying design procedures among many models of machines. The basic settings totally describe the relative positioning between the tool and workpiece at any instant.

Basic machine settings for forming gears are known in the art and may be defined as follows:

1. cradle angle (q) which defines the angular position of the tool about the cradle axis;
2. radial setting (S) which is the distance between the cradle axis and the tool axis;
3. swivel angle (j) which defines the orientation of the tool axis relative to a fixed reference on the cradle;
4. tilt angle (i) which defines the angle between the cradle axis and the tool axis;
5. root angle ($y_m$) which sets forth the orientation of the work support relative to the cradle axis;
6. center-to-back or head setting ($X_p$) which is a distance along the work axis from the apparent intersection of the work and cradle axes to a point located a fixed distance from the workpiece;
7. work offset ($E_m$) which defines the distance between the work axis and the cradle axis;
8. sliding base ($X_b$) which is the distance from the machine center to the apparent intersection of the work and cradle axes;
9. rotational position of the workpiece ($\omega_w$);
10. rotational position of the tool ($\omega_t$), for face hobbing;
11. ratio-of-roll ($R_a$) between cradle rotation and workpiece rotation, for generating.

In conventional gear forming machines, the cradle angle, workpiece rotation and tool rotation change during generation while the other settings generally remain fixed. Two notable exceptions to this are helical motion which involves motion of the sliding base, $X_b$, and vertical motion which is motion on the work offset direction, $E_m$.

The conventional mechanical machine meets the concept of the theoretical basic machine since nearly all machine settings correspond to theoretical basic settings. Such a machine is illustrated by FIG. 4. In the mechanical machine, the basic setting for the radial, S, is controlled by an angular machine setting known as the eccentric angle.

Generating and non-generating processes are usually carried out on conventional mechanical gear generating machines or on rectilinear multi-axis computer controlled (e.g. CNC) gear generating machines (such machines also being known as "free-form" machines). Conventional mechanical gear generating machines for producing bevel gears comprise a work support mechanism and a cradle mechanism. During a generating process, the cradle carries a circular tool along a circular path about an axis known as the cradle axis. This is known as the generating roll or cradle roll. The cradle represents the body of the theoretical generating gear and the cradle axis corresponds to the axis of the theoretical generating gear. The tool represents one or more teeth on the generating gear. The work support orients a workpiece relative to the cradle and rotates it at a specified ratio to the cradle rotation. Traditionally, conventional mechanical cradle-style bevel gear generating machines are usually equipped with a series of linear and angular scales (i.e. settings) which assist the operator in accurately locating the various machine components in their proper positions.

It is common in many types of conventional mechanical cradle-style bevel gear generating machines to include an adjustable mechanism which enables tilting of the cutter spindle, and hence, the cutting tool axis, relative to the axis of the cradle (i.e. the cutter axis is not parallel to the cradle axis). Known as "cutter tilt," the adjustment is usually utilized in order to match the cutting tool pressure angle to the pressure angle of the workpiece, and/or to position the cutting surfaces of the tool to appropriately represent the tooth surfaces of the theoretical generating gear. In some types of conventional mechanical cradle-style bevel gear generating machines without a cutter tilt mechanism, the effects of cutter tilt may be achieved by an altering of the relative rolling relationship between the cradle and workpiece. This altering is also known as "modified roll." (only for fixed setting)

In multi-axis computer controlled gear generating machines, such as those disclosed by U.S. Pat. Nos. 4,981, 402; 6,669,415 and 6,712,566, the disclosures of which are hereby incorporated by reference, movement of a tool relative to a workpiece along or about multiple machine axes (e.g. 5 or 6) can perform the cycle of movements including the kinematical relationship of the work and tool in the manner the same (or nearly the same) as that performed to generate a bevel gear in a conventional machine process utilizing a known face mill cutter or grinding wheel.

It has generally become the practice in the art to utilize the same input parameters (e.g. machine settings) as a conventional mechanical cradle-style gear generating machine for multi-axis computer controlled gear generating machines having a different number and/or configuration of axes. In other words, the positions of the tool and workpiece axes in the coordinate system of a conventional mechanical cradle-style bevel gear generating machine are transformed into the alternative coordinate system of the multi-axis computer controlled gear generating machine. Examples of such transformations can be found in the above referenced U.S. Pat. Nos. 4,981,402; 6,669,415 and 6,712,566, the disclosures of which are hereby incorporated by reference.

Bevel and hypoid gears which are cut in a continuous indexing process (face hobbing) have generally a parallel tooth depth along the face width. A basic cutting setup in the generating or cradle plane will put the center of the cutter head in a position which is away from the generating gear center (cradle axis) by an amount commonly referred to as the radial distance. The cutter head axis is parallel to the generating gear or cradle axis. A gear blank can be positioned in front of the cradle and the cutter, such that the cutter blades will cut the gear slots. The cutting edges of the basic cutting setup are straight in order to resemble the generating gear profile. While the cutter rotates, the gear will have to rotate during each cutter revolution by as many pitches, as the cutter has starts (blade groups). In order to generate the profile form of the gear teeth, the generating gear has to rotate about its axis, while the gear rotates by the generating gear rotation angle multiplied by the ratio of roll. The ratio of roll is the number of generating gear teeth divided by the number of work gear teeth.

A mating pinion to the described gear is cut and generated the same way. However, if the gear was generated with the cutter head center above the center of the generating gear (right hand spiral), then the pinion has to be generated with the cutter center below the center of the generating gear (left hand spiral). Pinion and gear generated in this manner will have an epicyclic flank line and on octoide tooth profile. Since both members are generated with mirror images of the generating gear, they will roll together perfectly conjugate. This means pinion and gear contact each other along contact lines which extend over the entire active flank surface. In a theoretical environment, pinion and gear will roll without motion error and have a full flank contact.

Gears produced for practical applications require a located flank contact in order to allow for load affected deflections of gearbox, shafts, gear bodies and teeth. In particularly for large gears, a crowning in profile (i.e. tooth height) direction and a crowning in face width (i.e. tooth lengthwise) direction is applied to both members. The crowning in profile direction is generally accomplished by changing the straight cutting edge profile of the cutting blades to a concave curve. Pinion and gear blades preferably receive the same radius of curvature such that each of them contributes to 50% of the profile crowning.

The crowning in the length direction for gears up to a ring gear diameter of about 800 mm is generally accomplished by inclination of the cutter head (i.e. cutter tilt). The cutter head inclination is arranged such that the original spiral angle and tooth slot proportions in the center of the teeth remain constant. Deeper cutting towards the ends will make the tooth slots wider towards the ends thereby creating a crowning in face width direction.

In bevel gear sets with a ring gear diameter above 800 mm it becomes difficult to realize a provision in a mechanical machine to tilt a cutter head in space. If the manufacturing machine is a 6-axis numerically controlled free form machine, then the cutter tilt is converted into an interpolating motion of the pivot axis (e.g. U.S. Pat. No. 4,981,402 discussed above). In case of such large gears it has been found that it is also difficult to realize such a highly precise interpolating motion of a machine component which can weigh several tons. Consequently, all dedicated large bevel gear manufacturing machines avoid the principle of a tilted cutter. As a consequence, the required length crowning is generated by slightly changing the radii of the cutting blade location relative to the cutter head axis. In some cases, for example, it is sufficient if the radial location of the inside blades of pinion and gear cutter is reduced by about 1% of the nominal cutter radius. The inside blades will generate a circular stock off condition moving from the center of the teeth to the inner or outer end of the teeth. The modified convex pinion flanks mesh with the unmodified concave gear flanks and the modified convex gear flanks mesh with the unmodified concave pinion flanks. This interaction will provide the desired amount of crowning in face width direction in both rotational directions of the gearset.

Outside and inside blades of a face hobbing cutter head initially have, before a radius modification is introduced, the same radius at the blade reference point. The continuous indexing motion rotates the work by the angular slot width after the first blade (e.g. outside blade) of one blade group passes a certain point along the face width until the second blade of the same blade group (e.g. inside blade) passes the same point within the same slot. If the radii of the inside blades are reduced in order to generate length crowning, then the produced slot width will be too large. As a consequence, there are two methods to cut the correct slot width:
  (a) First setup for cutting convex flanks and second setup for cutting concave flanks
  (b) Two interlocking face cutters connected to two different spindle connections on cutting machine Method (a) requires two different cutting machine setups and two separate cutting cycles. Method (b) requires a complex "second spindle in the first spindle" arrangement, where the second spindle requires an eccentricity offset versus the first spindle which also requires a provision for correct angular orientation in the generating gear plane. Method (b) reduces the machine stiffness and therefore requires small generating roll rates (compared to a single cutter-spindle connection). All large face hobbed gears, which require cutter head diameters above 210 mm are manufactured according to method (a). Method (a) requires nearly twice the cutting time than that of a conventional completing process.

A cutter radius modification therefore prevents a completing cutting process for large gears. A cutter head tilt will activate in numerically controlled machines an interpolating swing angle (root angle) motion during the entire generating process. Although this would still allow a completing process, the interpolating (coupled) rotation of only fractional degree amounts of a machine component with the weight of several tons will reduce process stiffness and accuracy and also be very costly in its mechanical realization.

A face hobbing or face milling cutting method which performs a completing cutting process that generates the desired amounts of length crowning requires either a cutter radius modification or an interpolating swing axis motion. For a productive completing process of manufacturing bevel gears with a ring gear diameter above about 800 mm, cutter radius modifications will not be reasonably possible and a cutter head tilt (equal to an interpolating swing (pivot) axis motion in free form machine) reduces process stiffness and therefore reduces productivity and accuracy. The present invention presents a solution to overcome these and other deficiencies.

SUMMARY OF THE INVENTION

The present invention is directed to a method of machining bevel gears whereby machining of both flanks of a tooth slot and crowning of the tooth surfaces in the lengthwise direction are realized without an active pivot axis and by a modification of the conventional relationship between the radial and swivel basic settings during gear generating.

DETAILED DESCRIPTION OF THE PREFERRED EMBODIMENT

Figure 1:
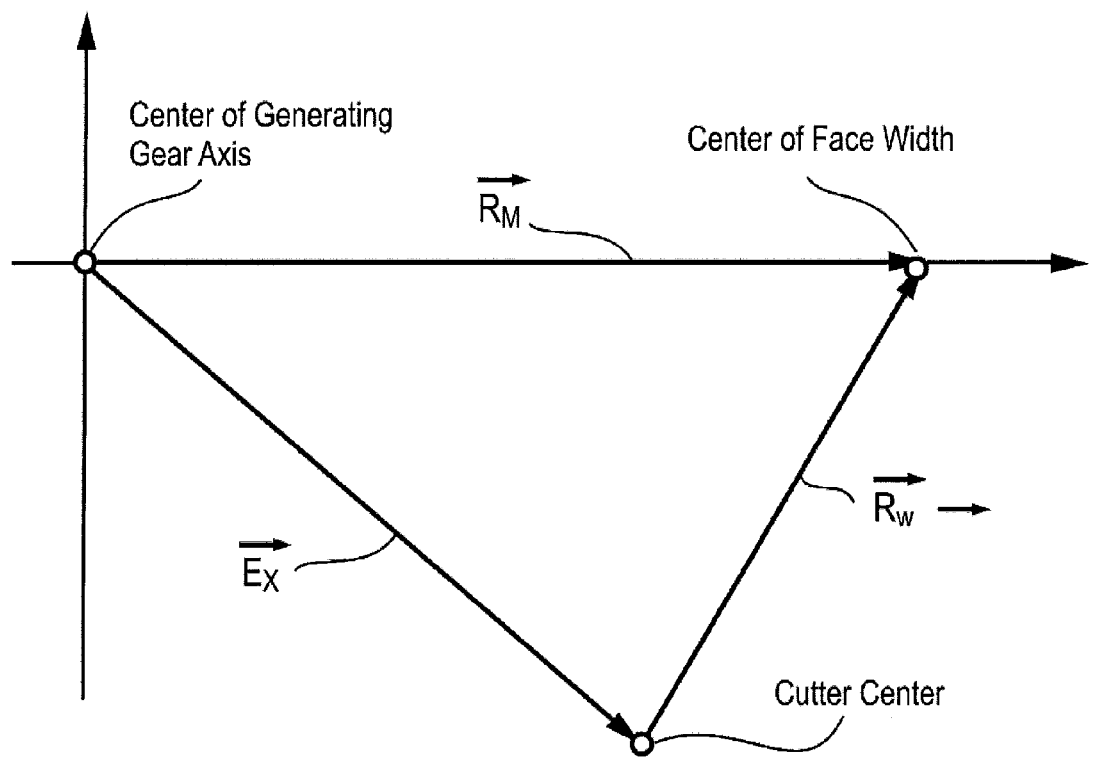
FIG. 1 shows a triangular vector diagram for conjugate completing bevel gearing.

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

The terms "invention," "the invention," and "the present invention" used in this specification are intended to refer broadly to all of the subject matter of this specification and the patent claims below. Statements containing these terms should not be understood to limit the subject matter described herein or to limit the meaning or scope of any patent claim below. Furthermore, this specification does not seek to describe or limit the subject matter covered by the claims in any particular part, paragraph, statement or drawing of the application. The subject matter should be understood by reference to the entire specification, all drawings and claims below.

In the context of the present invention, the term "bevel" gears is understood to be of sufficient scope to include those types of gears known as bevel gears, "hypoid" gears, angle gears, as well as those gears known as "crown" or "face" gears. It should also be understood that the terms "gear set" or "gear pair" refer to mating members comprising a pinion member, usually the driving member, and a mating gear member (e.g. ring gear), usually the driven member.

The present invention is directed to a method of cutting bevel gears which allows a completing cutting of both flanks of a tooth slot and achieves length crowning in the interaction of pinion and gear by modification of the effective radii. The inventive method may be applied to either or both members of a bevel gear set.

Figure 3A:
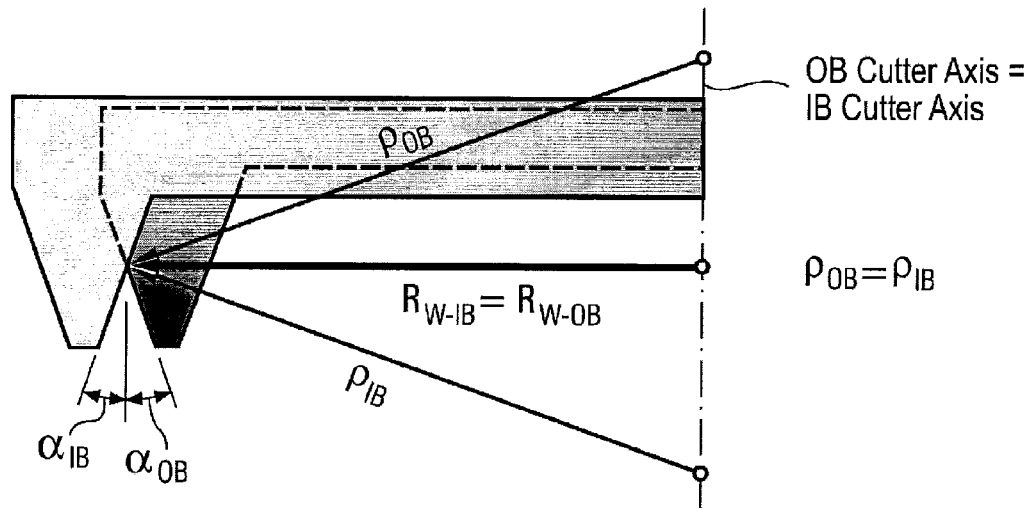
FIG. 3(a) shows a side view onto the cross section of 2 cutter heads with identical axes. The cutter radii $R_{W\text{-}IB}$ and $R_{W\text{-}OB}$ are identical for outside and inside blade. Also, the radii of curvature $\rho_{OB}$ and $\rho_{IB}$ are identical.
Figure 3B:
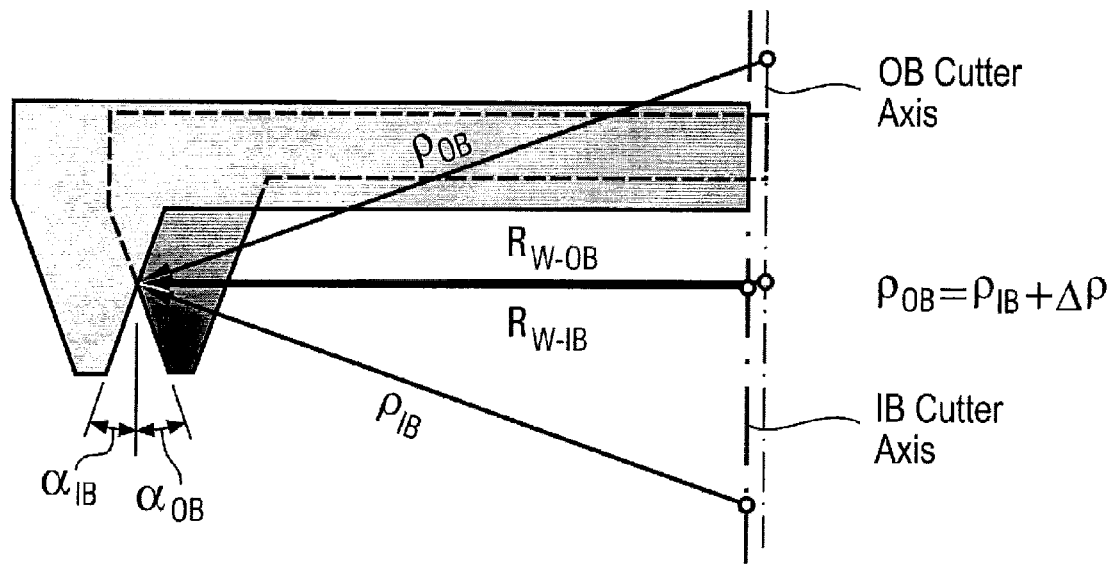
FIG. 3b shows the side view onto the cross section of 2 cutter heads with different axes. Their cutter radii are shown in the drawing plane. $R_{W\text{-}IB}$ is by $\Delta R$ smaller than $R_{W\text{-}OB}$ (blade reference points lined up). Also, the radii of curvature are different by $\Delta\rho$. $\rho_{OB}=\rho_{IB}+\Delta\rho$.
Figure 3C:
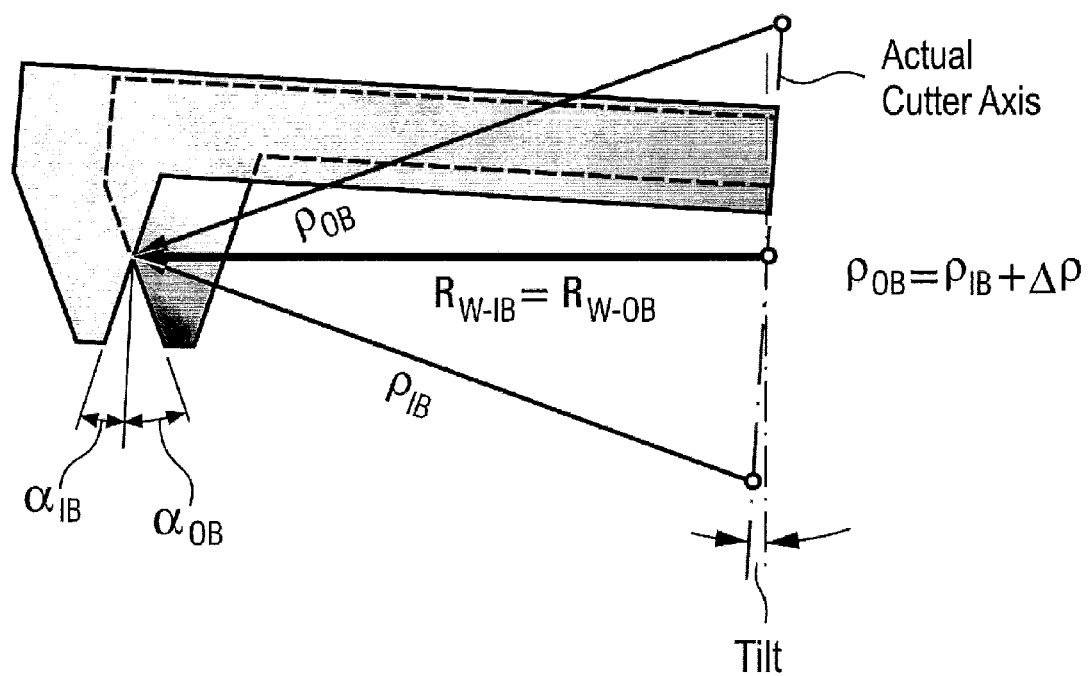
FIG. 3c shows a side view onto the cross section of a single cutter with outside and inside blades. The cutter radii are shown in the drawing plane. The cutter is tilted about an axis which is perpendicular to the drawing plane. The blade angles $\alpha_{IB}$ and $\alpha_{OB}$ are corrected to present the same reference profile to a horizontal line as that of a non-tilted cutter. The cutter radii $R_{W\text{-}IB}$ and $R_{W\text{-}OB}$ are identical for outside and inside blade. The radii of curvature $\rho_{OB}$ and $\rho_{IB}$ are different ($\rho_{OB}=\rho_{IB}+\Delta\rho$).

It can be understood that if a cutter head tilt according to the principle in FIG. 3(c) is applied in the center roll position of a traditional bevel gear generator (FIG. 4), then this results in a certain X-, Y-, Z- and B-axis positions when transformed to the configuration of a free form machine (FIG. 7) for that particular roll position. A roll process, where all axis values for X-, Y- and Z of a free form machine are correctly transformed from basic settings, but the B-axis angle is kept constant in all roll positions at the value of the center roll position, will not be acceptable due to very large deviation to the theoretical flank surfaces of the pinion member and/or the gear member of a gear set. It has been discovered that a reverse swivel motion of the first order rotates the tilt orientation, for each degree of cradle rotation, one degree back into the original orientation.

Such an arrangement with a reverse swivel motion will eliminate B-axis motions of a free form machine (after basic settings are converted for all roll positions) and also result in different X, Y and Z values (compared to the case without reverse swivel motion). Since the tilt and swivel provisions carry the cutter spindle, the cutter rotation (in continuous cutting) has to be corrected for every relative rotational amount (simultaneously as they occur by the reverse rotating swivel). It is also possible to correct the work rotation instead.

At the center of roll position the resulting flank surface (generating flat) will be identical the generating flat in case of a cutting without the reverse tilt motion. For small amounts of tilt angle, the flank form deviations between center of roll and end of roll position (e.g. heel) and center of roll and start roll position (e.g. toe) are very small and can be neglected. For larger amounts of tilt, the resulting flank deviations can be corrected by using first and second order helical motion, first and second order radial motion and first order modified roll.

FIG. 1 shows a generating gear plane with the generating gear axis with the vector $R_M$ to the center of the face width, the radial distance vector $E_X$ from the generating gear axis to the center of the cutter and the cutter radius vector $R_W$ from the tip of the $E_X$ vector to the tip of the RM vector. This represents a snap shot of cutting in the center roll position with the observed cutter blades in the rotational position where they cut a point at the mid-face of the tooth.

Figure 2:
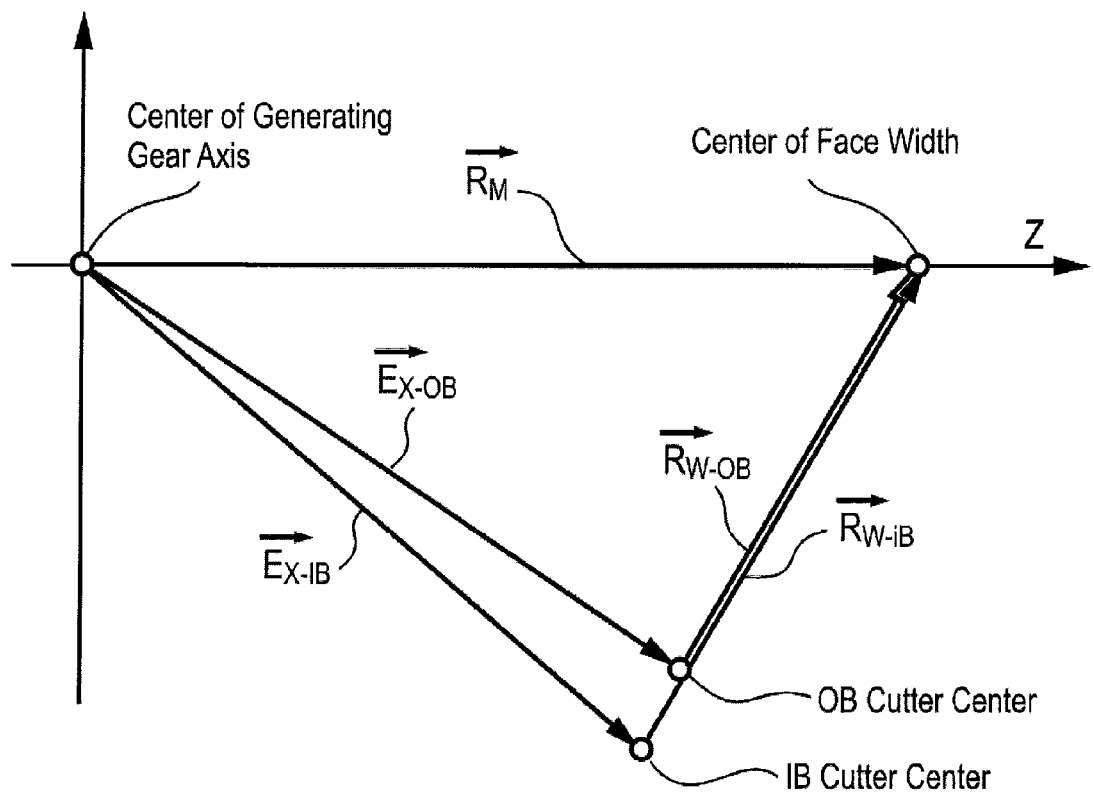
FIG. 2 shows a generating gear plane with two radial distance vectors to the centers of two separate cutters, one with inside blades for cutting of the convex flanks and one with outside blades for cutting the concave flanks.

FIG. 2 shows a generating gear plane with two radial distance vectors $E_{X-IB}$ and $E_{X-OB}$ to the centers of two separate cutters. One cutter has inside blades for cutting of the convex flanks represented by $R_{W-IB}$ and the second cutter has outside blades for cutting of the concave flanks represented by $R_{W-OB}$. The cutter centers have different locations (IB for cutting the convex flank and OB for cutting the concave flank) since the inside cutting edge positions have been moved to a smaller radius than the radius of the outside blades. The two cutter radius vectors have to be positioned such that the tips lie in the same point at the center of the face width and on the Z-axis of the generating gear coordinate system. This is necessary in order to produce the correct slot width (which is one pitch minus the tooth thickness plus any backlash).

FIG. 3(a) shows a view which is directed perpendicular to the cutter radius. The cutter head axis is parallel to the generating gear axis. The blade cutting edges in this example are straight. The cutter radii $R_{W-IB}$ and $R_{W-OB}$ are identical for outside and inside blade. The radius of curvature generated in lead direction of the concave flank is $\rho_{IB}=R_{W-IB}/\cos\alpha_{IB}$. The radius of curvature generated in lead direction of the convex flank is $\rho_{OB}=R_{W-OB}/\cos\alpha_{OB}$. Since $\alpha_{OB}$ and $\alpha_{IB}$ are equal, then $\rho_{IB}$ and $\rho_{OB}$ are also equal. If the cutter head in FIG. 3(a) is used to manufacture one member (e.g. the gear) and if a mirror image of this cutter head (mirror plane is X-Z) is used to manufacture the other member (e.g. the pinion), then the pair will be perfectly conjugate.

FIG. 3(b) shows a view which is directed perpendicular to the cutter radius. The cutter head axis is parallel to the generating gear axis. The blade cutting edges in this example are straight. The cutter radius $R_{W-IB}$ for the inside blade is by $\Delta R$ smaller than the radius $R_{W-OB}$ of the outside blade. The radius of curvature generated in lead direction of the concave flank is $\rho_{IB}=R_{W-IB}/\cos\alpha_{IB}$. The radius of curvature generated in lead direction of the convex flank is $\rho_{OB}=R_{W-OB}/\cos\alpha_{OB}$. Since $R_{W-IB}$ is smaller than $R_{W-OB}$, then $\rho_{IB}$ is also smaller than $\rho_{OB}$. Inside blades and outside blades are placed in different cutter heads. The axis of the inside blade cutter head is positioned such that the inside blade crosses the X-axis at the same point then the outside blade like in FIG. 3(a). If the cutter head in FIG. 3(b) is used to manufacture one member (e.g. the gear) and if a mirror image of this cutter head (mirror plane is X-Z) is used to manufacture the other member (e.g. the pinion), then gear sets with length crowning and also with the correct slot width are generated. A disadvantage of the arrangement in FIG. 3(b) is the fact that 2 cutting machine setups (or an interlocking cutter connected to a complex machine double spindle connection) will be required.

FIG. 3(c) shows a view which is directed perpendicular to the cutter radius. The blade cutting edges in this example are straight. The radii $R_{W-IB}$ and $R_{W-OB}$ are equal on the inside and the outside blade. Inside blades and outside blades are placed in the same cutter head. The cutter head is tilted about an axis which is perpendicular to the drawing plane. The blade angles relative to the generating gear axis (horizontal axis in FIG. 3(c)) are identical to FIG. 3(b). This requires (for example, in case of a 2° tilt) an inside blade angle of 18° and an outside blade angle of 22°. The radius of curvature generated in lead direction of the concave flank is $\rho_{IB}=R_{W-IB}/\cos\alpha_{IB}$. The radius of curvature generated in lead direction of the convex flank is $\rho_{OB}=R_{W-OB}/\cos\alpha_{OB}$. Since $\alpha_{IB}$ is smaller than $\alpha_{OB}$, then $\rho_{IB}$ is also smaller than $\rho_{OB}$. If the cutter head in FIG. 3(c) is used to manufacture one member (e.g. the gear) and if a mirror image of this cutter head (mirror plane is X-Z) is used to manufacture the other member (e.g. the pinion), then gear sets with length crowning and also with the correct slot width are generated. The advantage of the arrangement in FIG. 3(c) is the fact that only one cutting machine setup will be required in order to cut both, the convex (IB) flank and the concave (OB) flank of one member.

Figure 4:
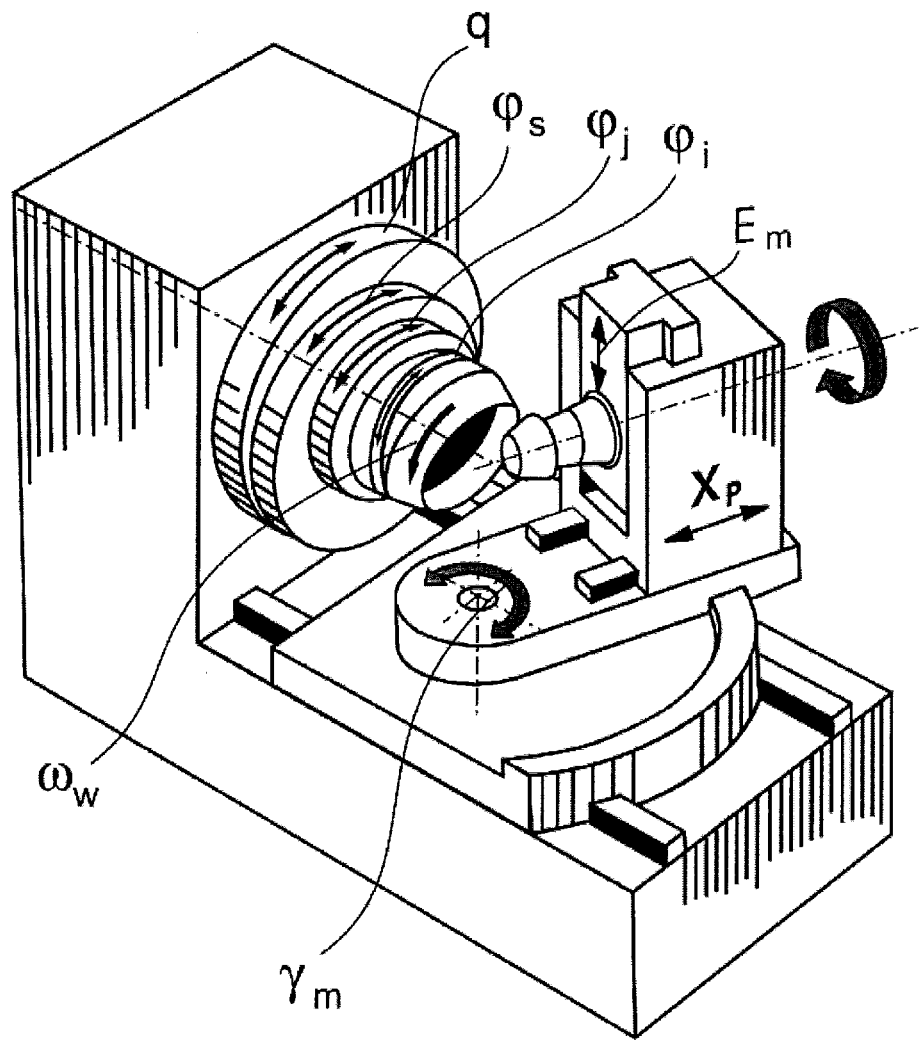
FIG. 4 shows a traditional bevel gear generator with cradle, radial setting provision, swivel angle provision, tilt angle provision, swing angle for root angle setting, center to back adjustment, offset adjustment, sliding base setting and not visible: ratio of roll coupling between cradle rotation and work rotation, and indexing ratio coupling between cutter rotation and additional work rotation.

FIG. 4 shows a conventional mechanical (and theoretical as discussed above) bevel gear generator with known settings comprising cradle (q), radial setting provision (S), swivel angle provision (j), tilt angle provision (i), swing angle for root angle setting ($\gamma_m$), center to back adjustment ($X_p$), offset adjustment ($E_m$), sliding base setting ($X_b$). Not shown are the ratio of roll coupling between cradle rotation and work rotation ($R_a$), and indexing ratio coupling between cutter rotation and an additional work rotation ($R_{ind}$).

Figure 5A:
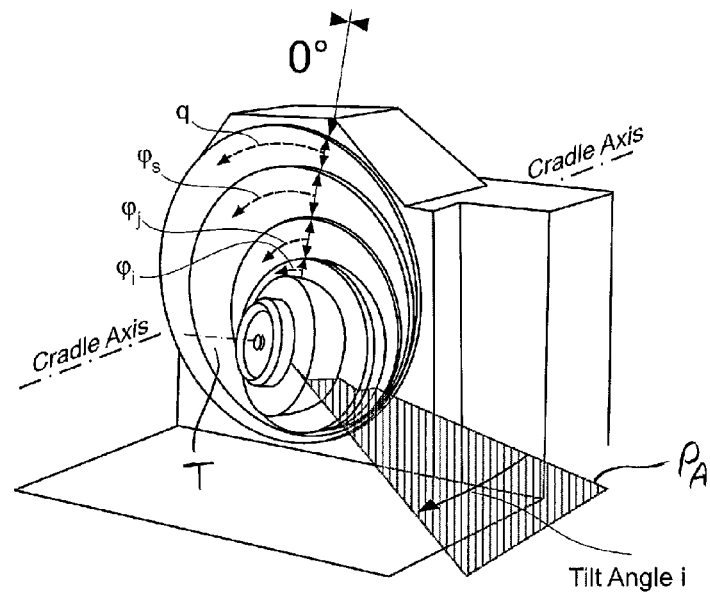
FIG. 5(a) shows a cradle, with radial, swivel and tilt mechanisms which rotate together (0° position).

FIG. 5(a) shows the graphic of a mechanical machine with provisions to:
Rotate the generating gear—(i.e. Cradle rotation, q);
Place the cutter center away from the center of the machine cradle (generating gear axis)—(rotational element for setting angle $\phi_S$ to achieve Radial Distance setting, S);
Inclination of the cutter head axis—(rotational element for setting angle $\phi_i$ to achieve Tilt Angle setting, i);
Rotate the inclined cutter axis about an axis perpendicular to the generating gear plane—rotational element for setting (angle $\phi_j$ to achieve Swivel Angle setting, j).

On a conventional (and hence, theoretical) bevel gear generating machines, the cradle, q, is rigidly connectable to the rotational element for setting the angle $\phi_S$ which in turn is rigidly connectable to the rotational element for setting the angle $\phi_j$ which in turn is rigidly connectable to the rotational element for setting the angle $\phi_i$. See FIG. 5(a) as an example of such an arrangement. The work gear and its associated machine elements and workholding equipment are not shown in FIG. 5(a) for the sake of clarity. Thus, upon rotation of the cradle q during generation, the rotational elements for setting angles $\phi_S$, $\phi_j$ and $\phi_i$ rotate along with cradle q given the rigid connections discussed above.

All cutter spindle setup positions in FIG. 5(a) are marked at their current setting with an arrow. The rotational position of the cradle shown in FIG. 5(a) is set at the start roll position. The auxiliary plane, $P_A$, connected to the swivel and tilt mechanisms and containing the tool axis, T, shows the cutter tilt angle i and the rotational position of the cradle.

Figure 5B:
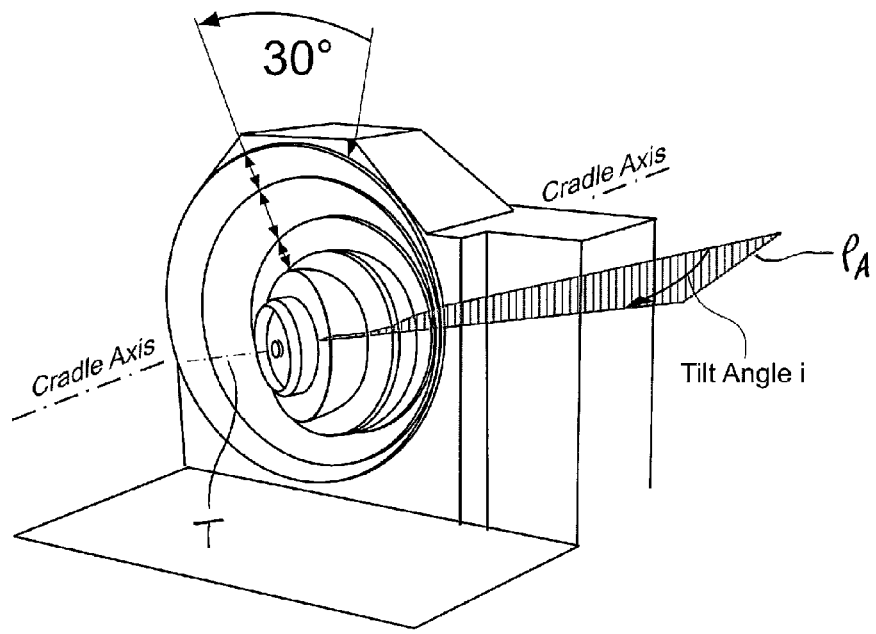
FIG. 5(b) shows a cradle, with radial, swivel and tilt mechanisms which rotate together (30° position).

FIG. 5(b) shows the same mechanical machine as shown in FIG. 5(a) but the cradle is rotated by 30° in a counterclockwise direction. With the cradle rotation the provisions (i.e. elements) for establishing radial distance, swivel angle and tilt angle did rotate together with the cradle also by 30° in counterclockwise direction. The arrow, attached to the cradle housing indicates an angle of 30° with respect to a reference mark on the cradle. The auxiliary plane, $P_A$, connected to the swivel and tilt mechanisms and containing the tool axis, T, shows the new rotational position of the cradle. In mechanical machines the tilt provision is rigidly clamped to the swivel provision and the swivel provision is rigidly clamped to the eccentric provision, which is why the kinematic condition in FIG. 5(b) is typical for mechanical machines.

Figure 5C:
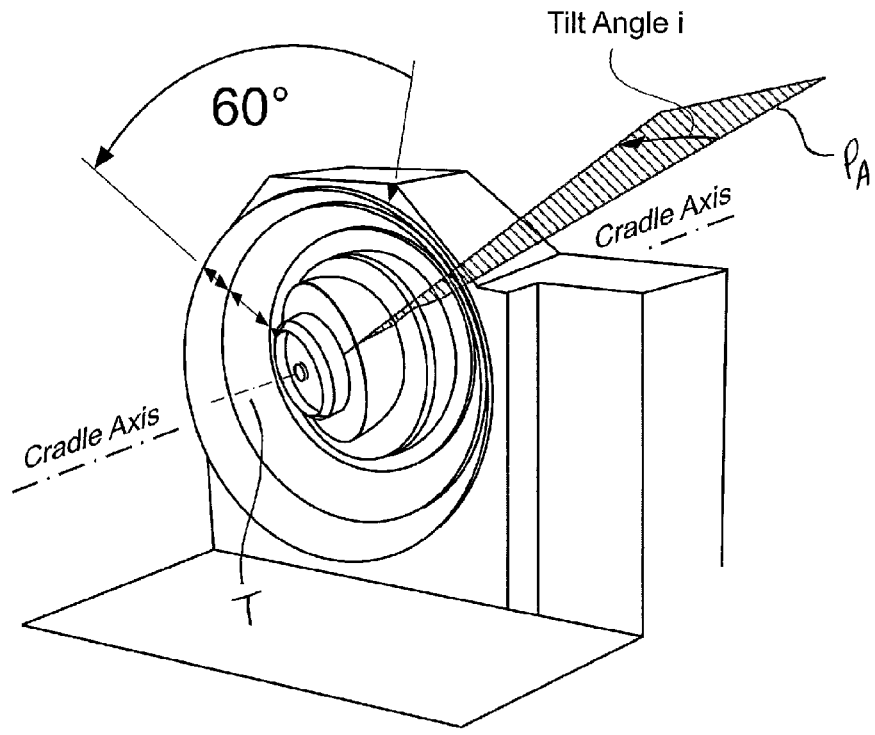
FIG. 5(c) shows a cradle, with radial, swivel and tilt mechanisms that rotate together (60° position)

FIG. 5(c) shows the same mechanical machine as shown in FIG. 5(a) but the cradle is now rotated by 60° in a counterclockwise direction. With the cradle rotation the provisions for radial distance, swivel angle and tilt angle did rotate together with the cradle also by 60° in the counterclockwise direction. The arrow, attached to the cradle housing includes now an angle of 60° with respect to the reference mark on the cradle. The auxiliary plane, $P_A$, connected to the swivel and tilt mechanisms and containing the tool axis, T, shows the new rotational position of the cradle. In mechanical machines the tilt provision is rigidly clamped to the swivel provision and the swivel provision is rigidly clamped to the eccentric provision, which is why the kinematic condition in FIG. 5(c) is typical for mechanical machines.

Figure 6A:
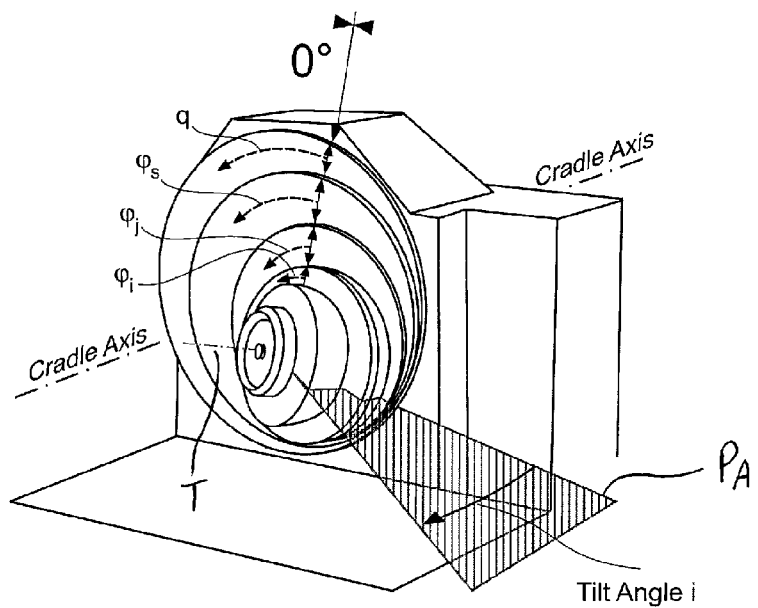
FIG. 6(a) shows a cradle which is rigidly connected to the radial drum. The tilt is rigidly connected to the swivel but the swivel is not rigidly connected to radial drum. Swivel and tilt are geo-stationary while the cradle rotates (0° position)

FIG. 6(a) shows the graphic of a mechanical machine with the same provisions as shown in FIG. 5(a). All cutter spindle setup positions in FIG. 6(a) are marked at their current setting with an arrow. The rotational position of the cradle shown in FIG. 6(a) is set at the start roll position. The auxiliary plane, $P_A$, connected to the swivel and tilt mechanisms and containing the tool axis, T, shows the cutter tilt angle and the rotational position of the cradle. FIG. 6(a) is identical to FIG. 5(a) but is now the outgoing position for a different demonstration.

Figure 6B:
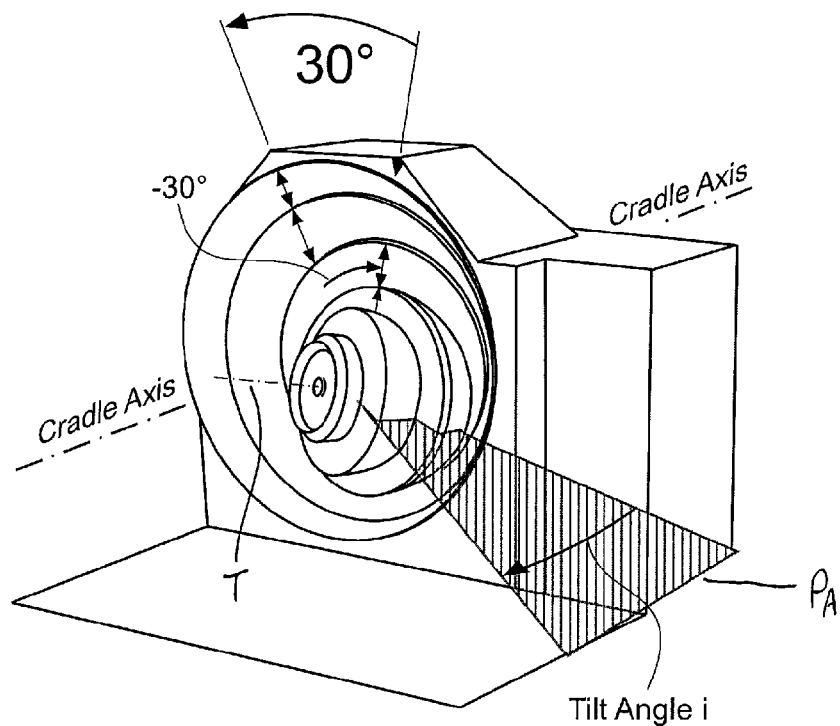
FIG. 6(b) shows a cradle which is rigidly connected to the radial drum. The tilt is rigidly connected to the swivel but the swivel is not rigidly connected to radial drum. Swivel and tilt are geo-stationary while the cradle rotates (30° position)

FIG. 6(b) shows the same mechanical machine as shown in FIG. 6(a) but the cradle is rotated by 30° in a counterclockwise direction. The provision for the radial distance, S, is rigidly connected with the cradle, q, and therefore rotated together with the cradle also by 30°. However according to the invention, the provision for the swivel, j, (tilt orientation) is no longer rigidly connected to the radial distance setup provision, but is effectively rotated (along with the rigidly connected tilt orientation, i) backwards (in clockwise direction) by an amount equal to the rotation of cradle, q, (i.e. by 30° in FIG. 6(b)) simultaneously with each increment of cradle rotation. As a result, the arrow attached to the cradle housing includes now an angle of 30° with respect to the reference mark on the cradle and in comparison to FIG. 5(b), the arrow connected to the swivel setting provision includes an angle of −30° with respect to a reference marks on the cradle and radial provisions. In other words, the net rotation result of the swivel and tilt provisions is zero. The auxiliary plane, $P_A$, connected to the swivel and tilt mechanisms and containing the tool axis, T, as a result of the adverse rotation between cradle and swivel (by the same absolute amounts), did not rotate in space but has the same orientation like in FIG. 6(a).

Figure 6C:
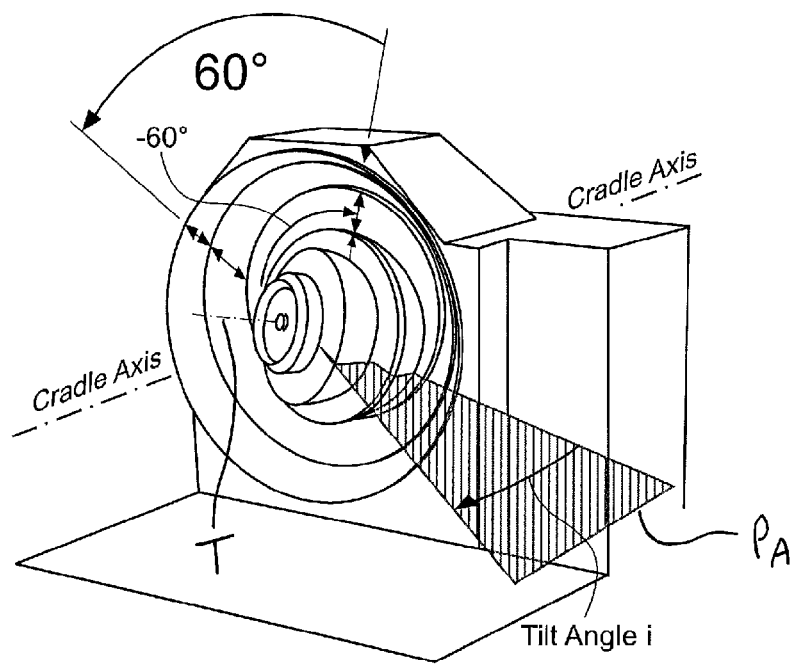
FIG. 6(c) shows a cradle which is rigidly connected to the radial drum. The tilt is rigidly connected to the swivel but the swivel is not rigidly connected to radial drum. Swivel and tilt are geo-stationary while the cradle rotates (60° position)

FIG. 6(c) shows the same mechanical machine as shown in FIG. 6(a) but the cradle is rotated by 60° in counterclockwise direction. The provision for the radial distance, S, is rigidly connected with the cradle, q, and therefore rotated together with the cradle also by 60°. However according to the invention, the provision for the swivel, j, (tilt orientation) is no longer rigidly connected to the radial distance setup provision, but is effectively rotated (along with the rigidly connected tilt orientation, i) backwards (in clockwise direction) by an amount equal to the rotation of cradle, q, (i.e. by 60° in FIG. 6(c)) simultaneously with each increment of cradle rotation. As a result, the arrow attached to the cradle housing includes now an angle of 60° with respect to the reference mark on the cradle and in comparison FIG. 6(b), the arrow connected to the swivel setting provision includes an angle of −60° with respect to the reference marks on the cradle and radial provisions. In other words, the net rotation result of the swivel and tilt provisions is zero. The auxiliary plane, $P_A$, connected to the swivel and tilt mechanisms and containing the tool axis, T, as a result of the adverse rotation between cradle and swivel (by the same absolute amounts), did not rotate in space but has the same orientation like in FIG. 6(a).

Figure 7:
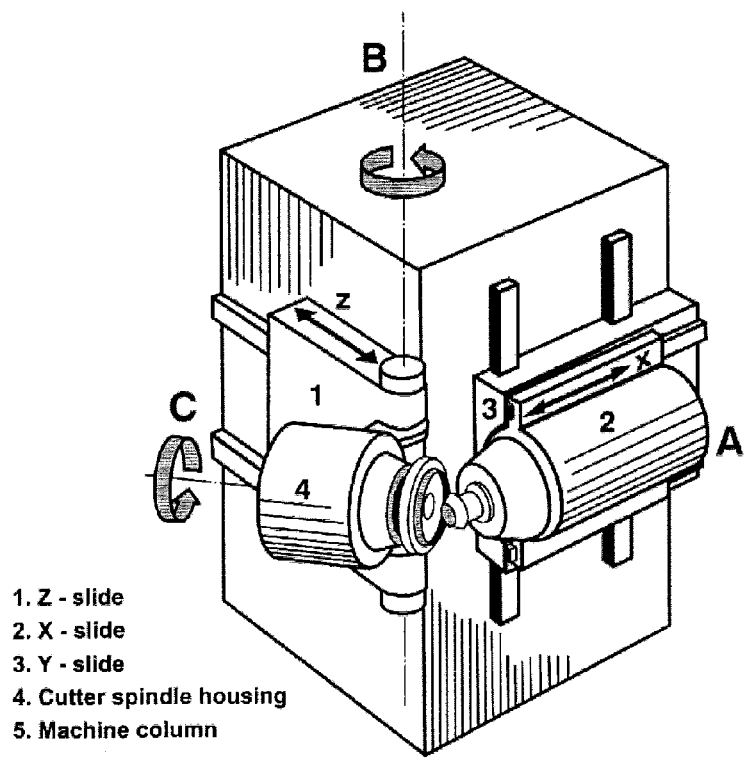
FIG. 7 illustrates a free form bevel gear manufacturing machine with rectilinear slides for vertical movement (Y), work axial movement (Z), and horizontal (X) movement and with a work rotation (A-spindle), a cutter rotation (C-spindle) and a swing rotation (B-axis).

FIG. 7 shows a free form bevel gear manufacturing machine with rectilinear slides for vertical movement (Y), work axial movement (Z), and horizontal (X) movement and with a work rotation (A-spindle), a cutter rotation (C-spindle) and a swing (pivot) rotation (B-axis). A coordinate transformation enables to convert the geometric and kinematic settings of a cradle style bevel gear cutting (or grinding) machine as shown in FIG. 4 in order to duplicate all relative motions between tool and work precisely with a free form machine as shown in FIG. 7 (see previously mentioned U.S. Pat. Nos. 4,981,402; 6,669,415 and 6,712,566).

In the transformation of a tilted cutter spindle rotating together with the cradle in space (as shown in FIGS. 5(a) to 5(c)) from a conventional mechanical machine to the free form machine as shown in FIG. 7, an angular change of the orientation between work and tool axis occurs during the generating roll process. This also means that the B-axis swing (pivot) angle between the tool and workpiece axes in the free form machine of FIG. 7 will constantly change during a generating roll process in the course of manufacturing a work piece.

However, in the transformation of a cutter spindle tilt which is stationary in space independent from the cradle rotation (as shown in FIGS. 6(a) to 6(c)) from a conventional mechanical machine to the free form machine as shown in FIG. 7, no angular change of the orientation between work and tool axis occurs during the generating roll process. This also means that the B-axis swing (pivot) angle between the tool and workpiece axes in the free form machine of FIG. 7 will not change during a generating roll process in the course of manufacturing a work piece.

The result of the transformation of the movements in FIGS. 6(a) to 6(c), in contrast to a transformation of the movements of FIGS. 5(a) to 5(c), will not only result in a constant B-axis angle for all roll positions, but also deliver different values of X, Y and Z.

Figure 8A:
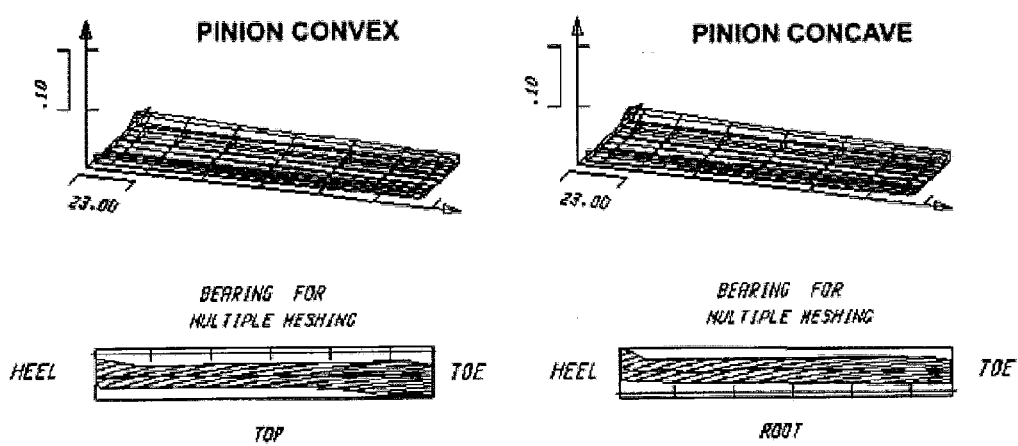
FIG. 8(a) shows the graphical analysis results of a gearset according to cutter definition in FIG. 3(a) and a cradle configuration (rotation) according to FIGS. 5(a) to 5(c).

FIG. 8(a) shows the Ease-Off and calculated tooth contact pattern of a gearset manufactured with the cutter arrangement in FIG. 3(a). The cutting simulation process is based on a tilt orientation condition as shown in FIGS. 5(a) to 5(c). The analysis results are independent from the type of gear manufacturing machine (e.g. FIG. 4 or FIG. 7) used. The analysis results show no length crowning (due to the cutter arrangement in FIG. 3(a)). The profile crowning seen in FIG. 8(a) results from the use of curved blades which are typically used in the manufacture of large bevel gears. Because of the missing length crowning, the gearset used for the analysis in FIG. 8(a) is not suitable for practical usage.

Figure 8B:
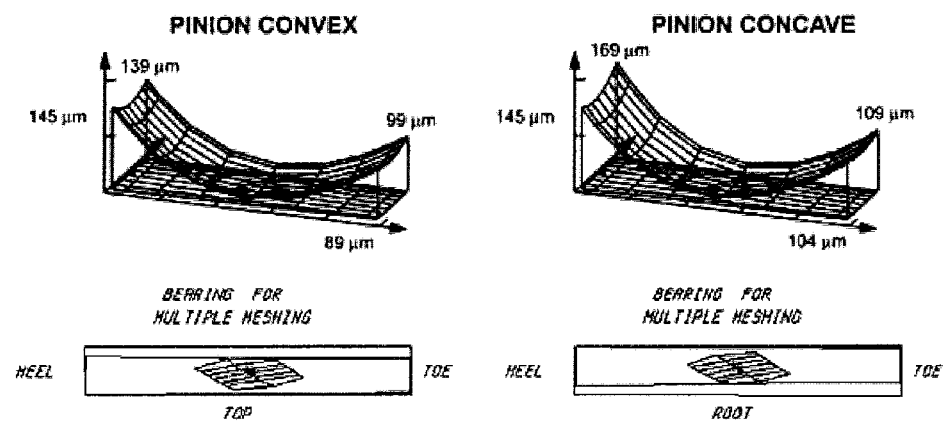
FIG. 8(b) shows the graphical analysis results of a gearset according to cutter definition in FIG. 3(b) and a cradle configuration (rotation) according to FIGS. 5(a) to 5(c).

FIG. 8(b) shows the Ease-Off and calculated tooth contact pattern of a gearset manufactured with the cutter arrangement in FIG. 3(b). The cutting simulation process is based on a tilt orientation condition as shown in FIGS. 5(a) to 5(c). The analysis results are independent form the fact if the manufacturing machine of FIG. 4 or FIG. 7 is used. The analysis results show profile crowning (due to curved blade cutting edges) and a length crowning in the 100 µm range. Length and profile crowning are required for the practical use of bevel gear sets. A disadvantage of the generating process with different cutter radii according to FIG. 3(b) is that two cutting machine setups (or an interlocking cutter connected to a complex machine double spindle connection) will be required.

Figure 8C:
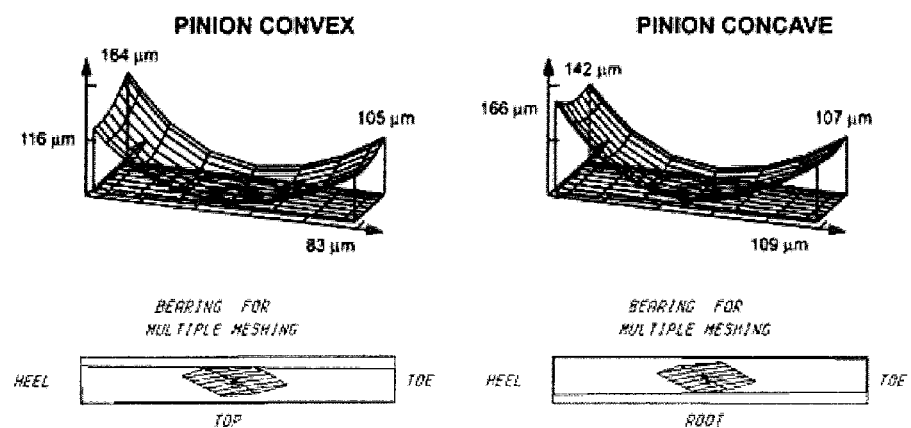
FIG. 8(c) shows the graphical analysis results of a gearset according to cutter definition in FIG. 3(c) and a cradle configuration (rotation) according to FIGS. 5(a) to 5(c).

FIG. 8(c) shows the Ease-Off and calculated tooth contact pattern of a gearset manufactured with the cutter arrangement in FIG. 3(c). The cutting simulation process is based on a tilt orientation condition as shown in FIGS. 5(a) to 5(c). The analysis results are independent form the fact if the manufacturing machine of FIG. 4 or FIG. 7 is used. The analysis results show profile crowning (due to curved blade cutting edges) and a length crowning in the 100 µm range. Length and profile crowning are required for the practical use of bevel gear sets. The advantage of this arrangement is that only one cutting machine setup is used for each member in order to cut the inside and outside flanks with one cutter head in a completing process. The disadvantage of this arrangement in particular in connection with the manufacturing of large gears with a modern free form machine as shown in FIG. 7 is that the B-axis requires a constant angle change during the generating process.

Figure 8D:
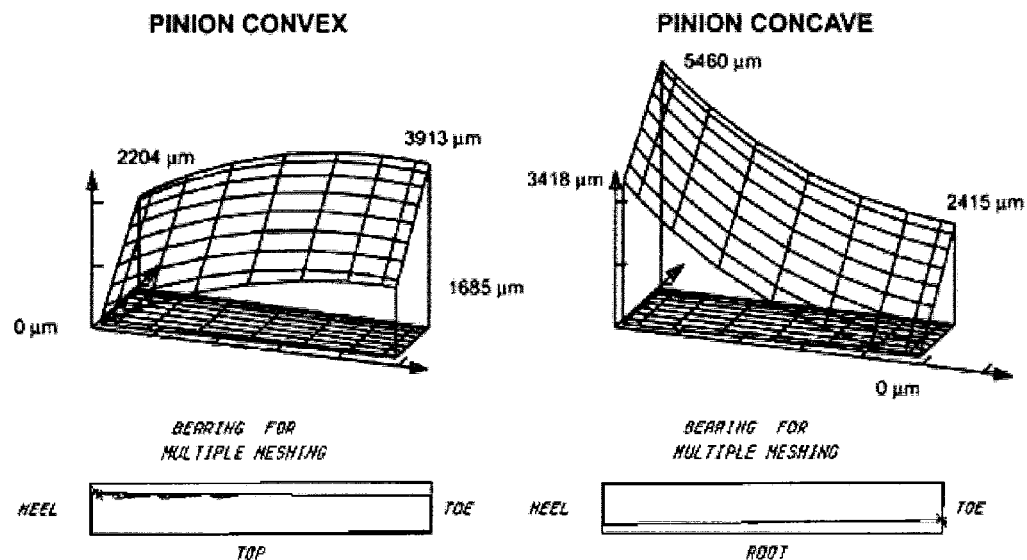
FIG. 8(d) shows the graphical analysis results of a gearset according to cutter definition in FIG. 3(c) and a cradle configuration (rotation) according to FIGS. 6(a) to 6(c).

FIG. 8(d) shows the Ease-Off and calculated tooth contact pattern of a gearset manufactured with the cutter arrangement in FIG. 3(c). The cutting simulation process is based on a tilt orientation condition as shown in FIGS. 6(a) to 6(c). The analysis results are independent from whether the manufacturing machine of FIG. 4 or FIG. 7 is used. However, because of the tilt provision not being rigidly fixed to the cradle but being geo-stationary in space, the transformation of the basic settings from a mechanical machine (FIG. 4) to a free form machine (FIG. 7) results in a fixed B-axis angle throughout the entire generating process. The analysis results in FIG. 8(d) show Ease-Off amounts with several thousand micrometers (µm). The gearset according to FIG. 8(d) is not suitable for practical usage.

Figure 8E:
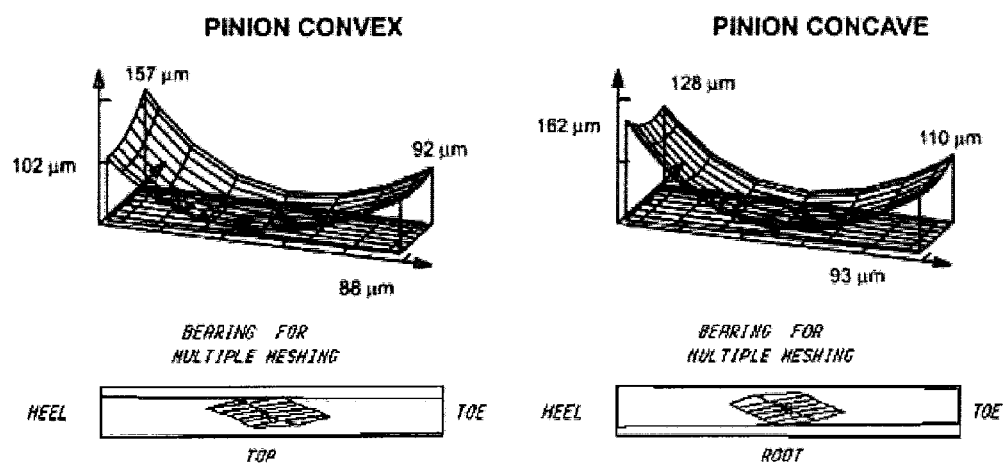
FIG. 8(e) shows the graphical analysis results of a gearset according to cutter definition in FIG. 3(c) and a cradle configuration (rotation) according to FIGS. 6(a) to 6(c) and an additional compensation of the cutter rotation (vs. scenario of FIG. 8(d)).

FIG. 8(e) shows the Ease-Off and calculated tooth contact pattern of a gearset manufactured with the cutter arrangement in FIG. 3(c). The cutting simulation process is based on a tilt orientation condition as shown in FIGS. 6(a) to 6(c). The generation of the gearset analyzed in FIG. 8(e), in contrast to the generation of the gearset in FIG. 8(d), includes an additional cutter rotation. This rotation was lost due to the non-rigid connected tilt and swivel provision and it compensates for the non-rotating tilt provision during the generating roll. The cutter rotation is actuated and defined relative to the tilt and swivel provision which carry the cutter spindle. For example from FIG. 6(a) to FIG. 6(b), the generating gear (cradle) rotates 30°. The cutter rotation should consist of, for example, a constant RPM plus (or minus) the additional 30° of the cradle rotation. The rotational compensation can also be performed with the work gear, considering the correct indexing ratio between cutter and work. The rotational compensation is only required for the continuous indexing cutting process (face hobbing).

The analysis results of FIG. 8(e) show profile crowning (due to curved blade cutting edges) and a length crowning in the 100 µm range. Length and profile crowning are required for the practical use of bevel gear sets. The first advantage of this arrangement is that only one cutting machine setup is used for each member in order to cut the inside and outside flanks with one cutter head in a completing process. Another advantage of this arrangement, in particular in connection with the manufacturing of large gears with a modern free form machine as shown in FIG. 7, is that the B-axis can be clamped at a constant value. This provides a significant increase in stiffness and accuracy.

Figure 8F:
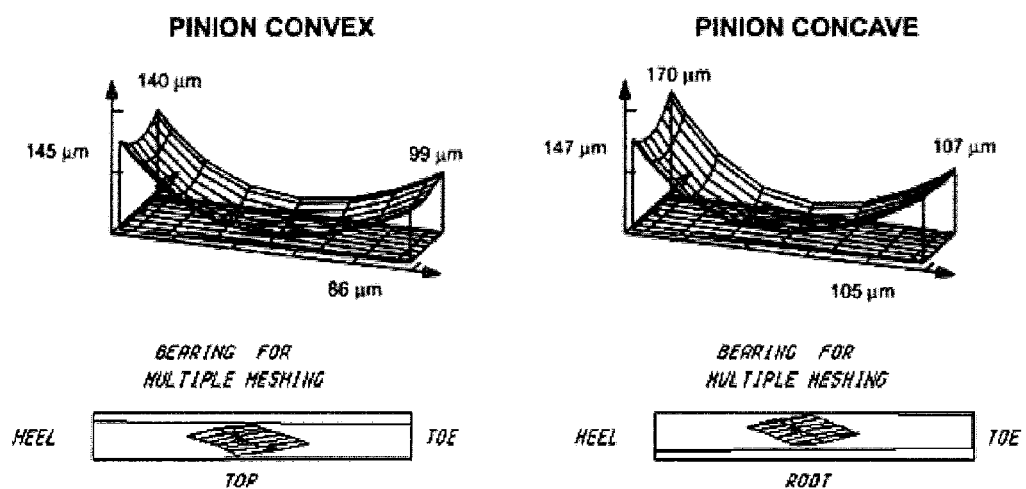
FIG. 8(f) shows the graphical analysis results of a gearset according to cutter definition in FIG. 3(c) and a cradle configuration (rotation) according to FIGS. 6(a) to 6(c) and an additional compensation of cutter rotation. The flank surfaces in FIG. 8(f) have been corrected with first order basic settings and second order motions.

FIG. 8(f) shows the Ease-Off and calculated contact pattern of the same gearset shown in FIG. 8(e) (cutter arrangement of FIG. 3(c) and tilt orientation condition as shown in FIGS. 6(a) to 6(c)). The difference to the case in FIG. 8(e) is an application of geometric and kinematic flank form corrections (such as, for example, flank form corrections of the type disclosed in U.S. Pat. No. 5,580,298, the disclosure of which is hereby incorporated by reference). The applied corrections approximate the original Ease-Off and tooth contact as shown in FIG. 8(a), without any B-axis angular movements during the generating process of pinion and gear. The approximation results in only very small differences on the extreme corners of the Ease-Off compared to FIG. 8(a).

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of manufacturing bevel gears on a rectilinear multi-axis computer-controlled gear generating machine by moving a tool having a tool axis and a workpiece having a workpiece axis relative to one another according to a generating process, wherein said generating is defined by parameters including rotation of a cradle of a theoretical gear generating machine, said cradle comprising rotatable and positionable elements for establishing settings for radial distance S, tool axis swivel j and tool axis tilt i; and, wherein an auxiliary plane $P_A$ is defined as being connected to said rotatable and positionable elements for establishing angular settings for said tool axis swivel j and tool axis tilt i, said auxiliary plane $P_A$ further containing said tool axis;

rotating said tool about said tool axis;

engaging said tool with said workpiece;

moving said tool relative to said workpiece to generate said bevel gear, said tool moving along a path described by rotation of said cradle;

said method further comprising rotating said rotatable element for establishing the angular setting for radial distance S along with said cradle rotation, wherein during said cradle rotation, said rotatable elements for establishing angular settings for tool axis swivel j and tool axis tilt I exhibit a net amount of rotation equal to zero and wherein said auxiliary plane $P_A$ remains in a fixed angular orientation during said cradle rotation;

said method being further characterized by no relative pivoting motion between said tool axis and said workpiece axis during said generating on said rectilinear multi-axis computer-controlled gear generating machine.

2. The method of claim 1 wherein said bevel gear is a ring gear.

3. The method of claim 2 wherein said ring gear has a diameter greater than 800 mm.

4. The method of claim 1 wherein said bevel gear is a pinion.

5. The method of claim 1 wherein said generating process is a face milling process.

6. The method of claim 1 wherein said generating process is a face hobbing process.

7. The method of claim 1 wherein said tool is a cutting tool.

8. The method of claim 1 wherein said tool is a grinding tool.

* * * * *